June 10, 1930.  J. C. YATES  1,763,031
SPOON HOOK
Filed Aug. 28, 1929
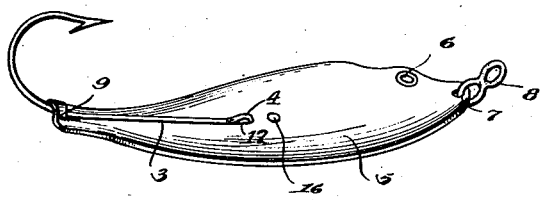
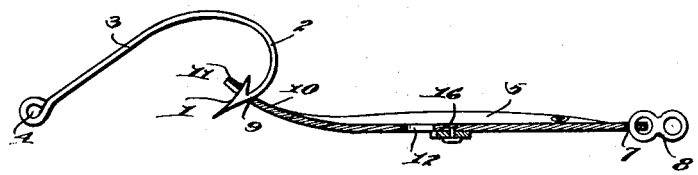
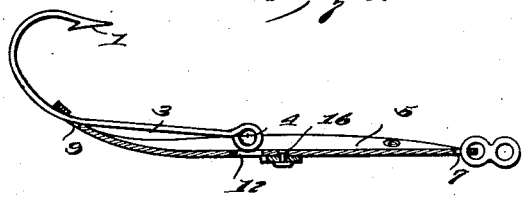
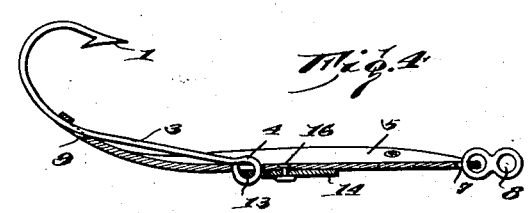
INVENTOR,
J. C. Yates.
BY
Sterling P. Buck,
ATTORNEY.

Patented June 10, 1930

1,763,031

UNITED STATES PATENT OFFICE

JOHN C. YATES, OF BALTIMORE, MARYLAND

SPOON HOOK

Application filed August 28, 1929. Serial No. 388,965.

This invention relates to fishing tackle, and especially to an improved spoon-hook.

One object of this invention is to provide an exceedingly simple and comparatively inexpensive spoon-hook which is also exceedingly effective and convenient.

A further object is to provide a spoon-hook of this character, the hook being quickly and easily attachable and detachable, so that a broken or bent hook can be quickly removed and replaced by another hook, and so that hooks of different sizes and shapes can be interchanged quickly and easily.

Another object is to provide a spoon-hook of this character with a very simple and exceedingly effective fastening means which is easily manipulated by a thumb and fingers of the user, without the use of any tool or implement for fastening and unfastening the hook.

A further object is to provide a device of this character in which the hook and spoon are inseparably united when a fish is on the hook even if the fastening means should, (by any possible means) become disengaged from the eye of the hook.

Other objects and important features are pointed out or implied in the following details of description, in connection with the accompanying drawings in which:

Figure 1 is a perspective view of a spoon-hook constructed in accordance with this invention.

Fig. 2 is a longitudinal sectional view, the section being taken through the longitudinal central part of the spoon, the hook being in the position in which it is beginning to pass through one of the two openings which receive the hook.

Fig. 3 is a view similar to Fig. 2 but showing the hook in an intermediate position, or between the entering position and the fully attached position.

Fig. 4 is a view similar to Figs. 2 and 3, but showing the hook in its fully attached and secured position.

Fig. 5 is an enlarged perspective view of the combined keeper and handle member shown in Figs. 2, 3 and 4.

Referring to these drawings in detail in which similar reference characters correspond to similar parts in the several views, the invention is now described in detail as follows:

The hook is of the novel construction illustrated in my now pending application No. 221,487, filed September 23, 1927, examined in Division 62 of the U. S. Patent Office, including a pointed and barbed end portion 1, a bowed part 2, a shank 3, and an eye 4, this eye being in the same plane with the bowed part 2.

The hook, as usual, is of springy metal, and its elasticity is utilized for helping the securing member to hold it, as will presently be explained.

The spoon 5 is of somewhat rigid and springy sheet metal, preferably highly polished, and having the general outline and appearance of a minnow, its head portion having a simulation of an eye, as shown at 6, and being apertured at 7 for receiving an 8-shaped link 8. This link provides an effective means for attaching a fishing line, and protecting the line against being worn or chafed as it would be if passed through the opening 7.

The tail part of this imitation minnow is apertured at 9, and has a concave part 10 immediately in front of this aperture; and a concave part 11 immediately in rear of the aperture 9, the concave parts 10 and 11 being on opposite sides of the spoon. The concave part 11 is of a size and shape to conform to one side of the shank 3 when the latter is in the position shown in Fig. 3, while the front edge of the aperture 9 acts as a fulcrum which tends to hold the hook in the position shown in Fig. 3. However, when the eye 4 is pressed through a slot or opening 12 of the spoon, the shank 3 must be sprung into such position, and tends to spring back into the position shown in Fig. 4. This tendency is overcome by the detent or securing member shown in Fig. 5, including a hook 13, a handle 14 and an apertured intermediate part 15. Through the aperture of the part 15, a rivet extends and forms a pivot on which the part 13, 14 and 15 can be turned by the user who properly manipulates the handle 14. In addition to the fulcrum formed at 9, the front edge of the opening 12 forms a second fulcrum on which the end of the shank 3 rests, adjacent to the eye 4, and the hook 13 is of such size and shape that it conforms to the lower part of the loop 4 while tightly pressing against the latter, so as to overcome the tendency of the shank to spring back into a position out of the opening 12. The frictional engagement of the hook 13 with the eye 4 effectively prevents the accidental disconnection of these parts 4 and 13; but such frictional engagement can be overcome by proper manipulation and sufficient pressure on the handle 14.

If, by any means, the handle 14 should get caught against a ledge or snag in the bottom of a body of water, and thereby unfasten the hook 13 from the eye 4, the hook would still retain its engagement with the spoon, because the eye 13 is too large to be passed through the opening 9. The hook can be disengaged only by turning it so as to pass its barbed and pointed end 1 through the opening 9.

Although I have described this embodiment of my invention very specifically, it is not my intention to limit my patent protection to these exact details of construction and arrangement, for the invention is susceptible of numerous changes within the scope of the inventive ideas as implied and claimed.

What I claim as my invention is:

1. In a spoon-hook, the combination of a hook including a bowed part and an eye, the latter being in the same plane with the bowed part, a spoon having means at its front end for attaching a fishing line, the rear end of the spoon having an aperture therethrough at the rear end portion and having a concave part at the rear of said aperture for conforming to the shank of the hook, the front side of this aperture forming a fulcrum which combines with said concave part to hold the hook in a predetermined position, the middle part of said spoon being provided with an opening into which said eye can be compressed against spring action of the shank while the hook rests against said fulcrum, and a securing member pivotally mounted on said spoon and provided with an element to be passed into and out of said eye, for securing and releasing the hook, substantially as shown and specified.

2. In a spoon-hook, the combination of a hook having a barbed end and having an eye at its other end, a spoon having a central opening to receive said eye, and a securing member pivotally mounted adjacent to said central opening and provided with an element to be passed into and out of said eye, one end of said spoon having means to secure it to a fishing line, and the front end of said spoon having an aperture through which the barbed end of the hook can be passed, but this aperture being too small to permit said eye to pass therethrough, so the hook cannot be disengaged from the spoon while a fish is on the hook, substantially as specified.

3. In a spoon-hook, the combination of a spoon having a concave side and a convex side, said spoon having a central opening and also having an aperture at one end portion, a securing member pivotally mounted on the convex side, and a hook having one end formed with an eye which is adapted to be passed into said central opening and to be engaged by said pivotally mounted member while the shank of the hook extends through said aperture, and lies substantially within the concavity of the concave side, substantially as shown.

In testimony whereof I affix my signature.

JOHN C. YATES.